April 2, 1963　　　　L. H. HORNBROOK, JR　　　　3,083,579
CONTROL MECHANISM

Filed July 25, 1960　　　　　　　　　　　　　　4 Sheets-Sheet 1

INVENTOR.
LESTER H. HORNBROOK JR.
BY
ATTORNEY

April 2, 1963   L. H. HORNBROOK, JR   3,083,579
CONTROL MECHANISM

Filed July 25, 1960   4 Sheets-Sheet 2

INVENTOR.
LESTER H. HORNBROOK JR.

ATTORNEY

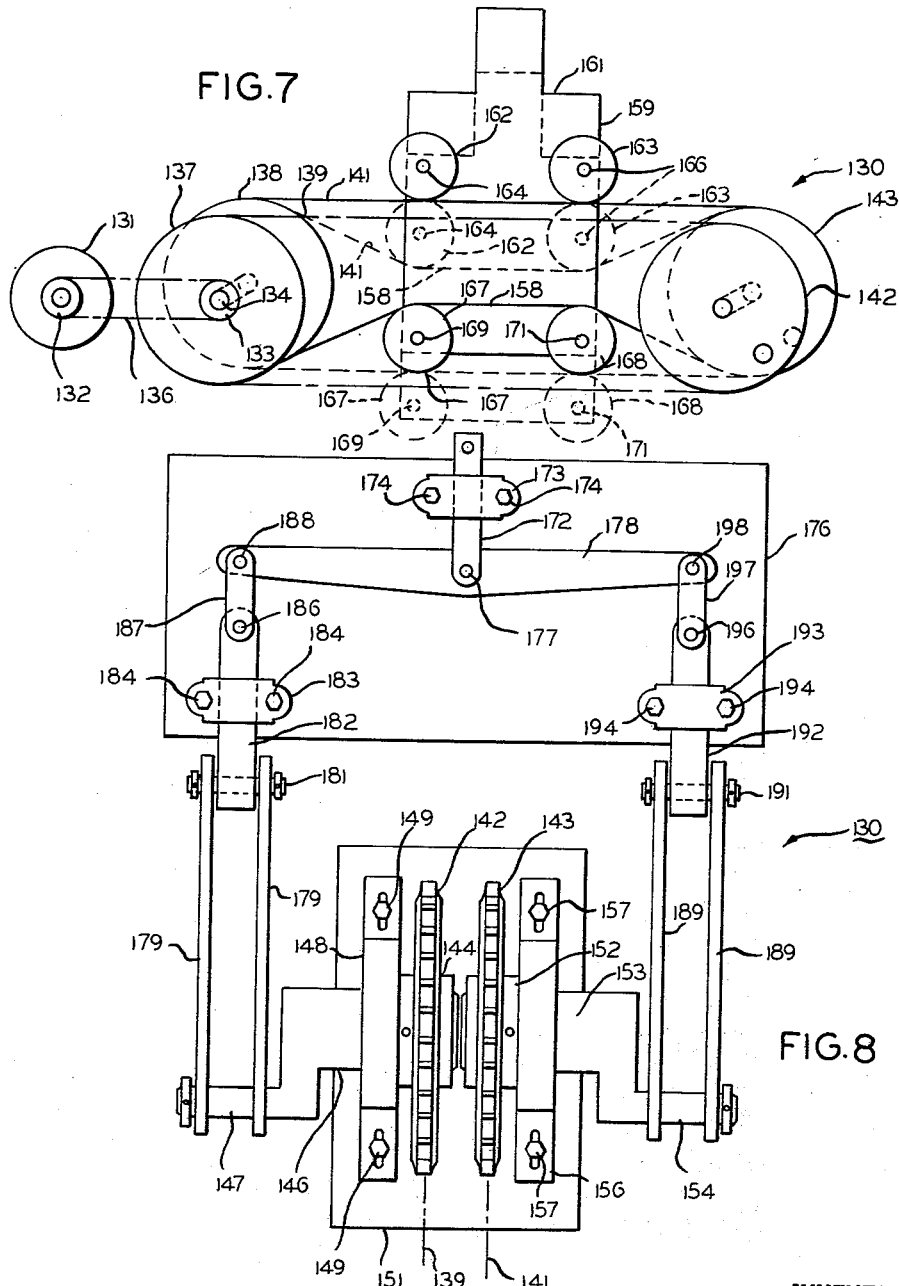

3,083,579
CONTROL MECHANISM
Lester H. Hornbrook, Jr., 811 Chilton Lane,
Wilmette, Ill.
Filed July 25, 1960, Ser. No. 46,866
8 Claims. (Cl. 74—25)

The invention relates generally to control mechanisms and has particular reference to mechanisms for controlling the length of the stroke of a powered device having reciprocating motion.

This application is a continuation-in-part of application Serial No. 839,787, filed September 14, 1959, and now abandoned.

Mechanism according to the present invention for achieving the motion described above includes structure for regulating the angular displacement of a pair of turning shafts with respect to each other, such angular displacement being achieved by an operator controlling the position of a bight of a chain or other endless strand forming a driving connection between the two shafts, the shafts each having eccentrics mounted thereon arranged to cooperate with linkages to provide a varied amplitude reciprocating motion in the powered device in accordance with the position of the operator.

In another embodiment of the invention, the motion described is achieved by a pair of driving and driven shafts which are drivably connected by endless strands. The angular position of one of the driven shafts with respect to the other is achieved by an operator which shifts a bight formed in one of the endless strands, and the resultant relative angular displacement of the shafts is caused to give a varying amplitude reciprocating motion by means of eccentrics cooperating with linkages therebetween.

In either case, varying amplitude reciprocating motion can be converted into rotary motion having angular velocity and acceleration characteristics consistent with the linear velocity and acceleration of the reciprocating motion.

With the foregoing considerations in mind, it is a principal object of this invention to provide an improved control mechanism for controlling the length of the stroke of a powered device having reciprocating motion.

Another object is to convert the rotary motion of a driving shaft and a driven shaft to a straight line reciprocating motion of a powered device, the stroke of which device is controlled by varying the position of a bight of a chain drivably connecting the two shafts.

Other objects and important features of the invention will be apparent from a study of the specification following taken with the drawings, which together described and illustrate a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawings:

FIG. 7 is a view similar to FIG. 1, showing a control mechanism according to another embodiment of the invention; and FIG. 8 is a plan view of a varying ampltiude reciprocating motion device adapted to be controlled in its motion by the mechanism of FIG. 7.

Figure 1:
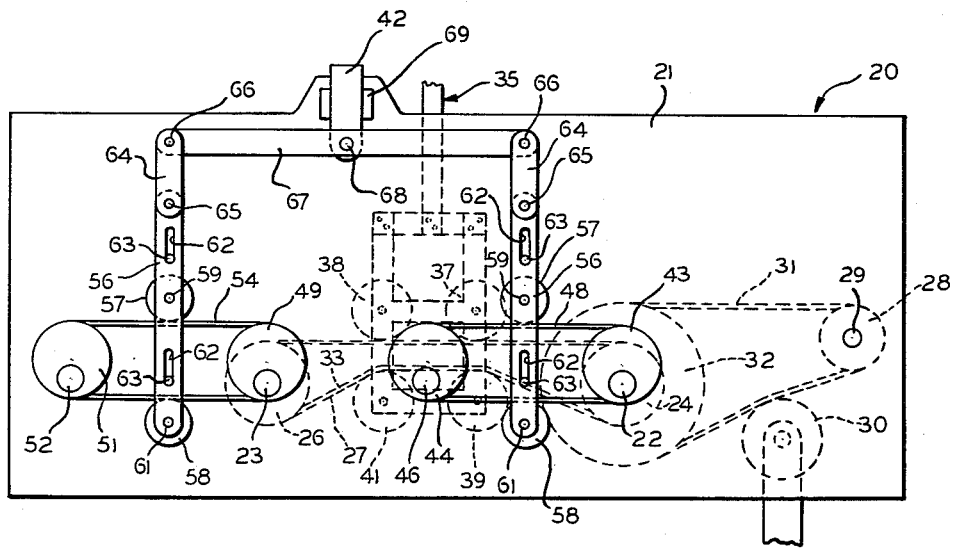
FIG. 1 is a schematic elevational view of a control mechanism embodying the features of the present invention.

Referring particularly to FIGS. 1 to 6 of the drawings, the control mechanism according to the present invention is referred to generally by the reference numeral 20 and includes a base plate 21 supporting a pair of spaced driven shafts 22 and 23, shafts 22 and 23 being connected in driving relationship by means of a sprocket 24 fast on the shaft 22 and a sprocket 26 fast on the shaft 23, the two sprockets 24 and 26 being drivably connected by a sprocket chain 27. Power for driving shafts 22 and 23 and sprockets 24 and 26 is provided by a driving sprocket 28 fast on a shaft 29 journalled in any suitable manner in the support plate 21, and a sprocket 28 driving a sprocket chain 31 turning a driving sprocket 32 fast on the driving shaft 22. An adjustable idler 30 may be provided for adjusting the slack in driving chain 31.

Figure 2:
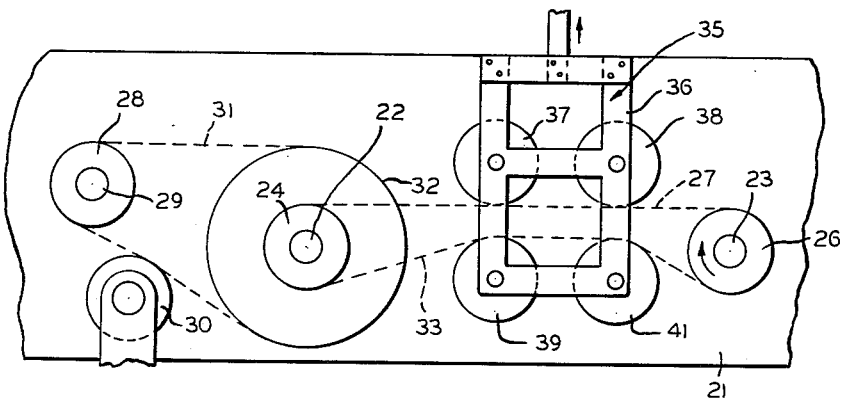
FIG. 2 is a rear view of the device seen in FIG. 1, illustrating how the bight in a drive chain connecting a pair of shafts seen in FIG. 1 may be adjusted in position so that the shafts connected by the chain are angularly displaced with respect to each other.
Figure 3:
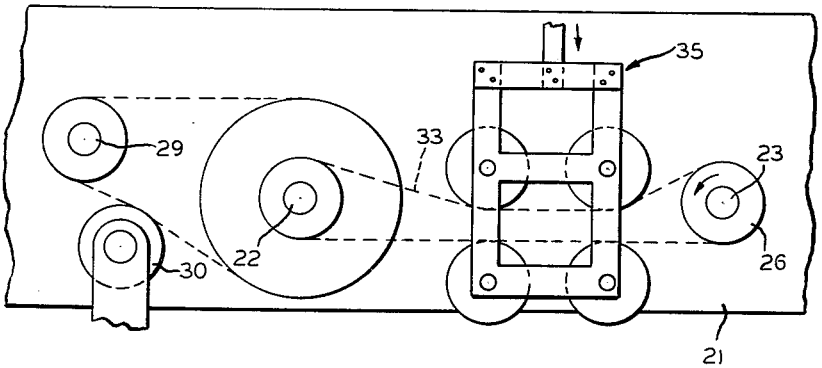
FIG. 3 is a view similar to FIG. 2, but showing the bight of the driving chain shifted to another position.

As seen particularly in FIGS. 1 to 3, the chain 27 connecting the two shafts 22 and 23 is arranged with a bight 33 which can be adjusted in position by means of a control device indicated generally by the reference numeral 35. The control device 35 includes a frame 36 having spaced shoes 37 and 38 supported thereon which engage one run of the chain extending between the sprockets 24 and 26, and spaced shoes 39 and 41 which engage the other run of the chain between the sprockets 24 and 26.

As seen in FIG. 2, the idler shoes 39 and 41 are positioned to place the bight 33 in the lower run of the chain. This will cause the shaft 23 to be displaced with respect to the shaft 22 a slight amount in a clockwise direction as indicated by the arrow on sprocket 26 seen in FIG. 2.

Conversely, the control device 35 can be shifted in the opposite direction so that the bight 33 is in the upper run of the chain extending between the sprockets 24 and 26. This will cause the shaft 23 to be displaced angularly with respect to the shaft 22, the amount of the angular displacement being indicated by the arrow on sprocket 26 seen in FIG. 3, such angular displacement being in a counterclockwise direction with respect to the shaft 22.

Referring now particularly to FIGS. 1 and 4 to 6 of the drawings, the relative displacement of the sprockets 24 and 26 is employed for giving a varying amplitude of movement to the reciprocating powered device 42, the period of which is related to the speed of the driving shaft 29. Shaft 22 accordingly has an eccentric 43 mounted thereon and a similar eccentric 44 is mounted to turn on a stub shaft 46 held to the plate 21, the two eccentrics 43 and 44 being in the form of sprockets engaged with an endless sprocket chain 48 trained therebetween. Alternately, the eccentrics 43 and 44 may be of a form so as to cooperate with a timing belt is desired.

The shaft 23 likewise has an eccentric 49 fast thereon, and a similar eccentric 51 is spaced from shaft 23 and is mounted upon a stub shaft 52 extending from the base plate 21. The two eccentrics 49 and 51 are also desirably in the form of sprockets having an endless sprocket chain trained therebetween. As with the eccentrics 43 and 44, eccentrics 49 and 51 may be of a form so as to cooperate with a timing belt, if desired.

Each of the eccentric systems thus far described thus causes their respective timing chains or belts 48 and 54 to move in an orbital path which is followed by a mechanism for giving a varying amplitude or motion to the device.

Each such structure for following the orbital motion of the chains or belts 48 and 54 includes a reciprocating member 56 supporting spaced idlers 57 and 58 which follow the upper and lower runs of the chains 48 and 54. The idlers 57 and 58 respectively turn on pins 59 and 61 extending from the reciprocating member 56, and the member 56 is guided for movement by means of slots 62 therein, each of which cooperates with a guide pin 63 extending from the base plate 21.

Each of the reciprocating members 56 is pivotally connected at 65 to link 64 pivotally connected at 66 to an end of a lever 67. The lever 67 is pivotally connected at 68 to the powered reciprocating device 42, which is guided for rectilinear motion between spaced guides 69.

Figure 5:
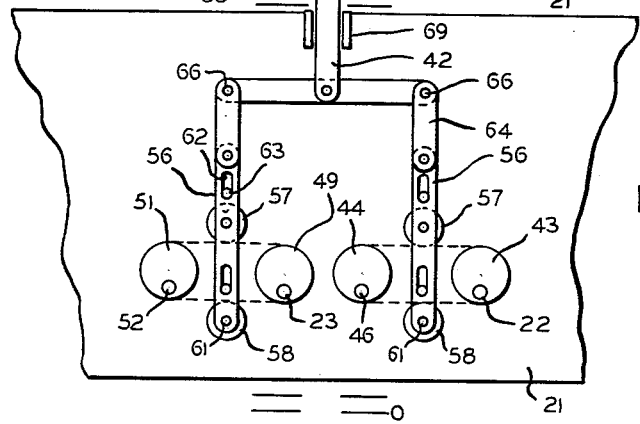
FIG. 5 is a view illustrating the device of FIGS. 1 to 3 so arranged as to give maximum amplitude of stroke to the powered device controlled thereby.

Referring now to FIG. 5, the paired eccentrics 43 and 44 are in the same position relative to the eccentrics 49 and 51 controlled in their position by the relative angle displacement of the shaft 23. Such position of the eccentrics described will be that corresponding to the position of the bight 33 of the chain 27, as seen in FIG. 1. The position of the control device 35 is such as to give maximum movement to the powered device 42.

Figure 6:
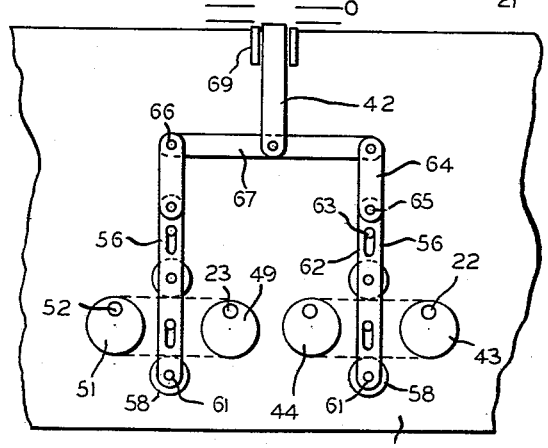
FIG. 6 is a view similar to FIG. 5, but showing the controlled device in its maximum displacement in an opposite direction.

FIG. 5 illustrates the maximum displacement of the device 42 which is guided between spaced lugs 69 on the base plate 21. In FIG. 6 the device 42 has moved to a position marking the opposite point in its path of movement, each of the eccentrics having moved to a 180° position away from the position seen in FIGS. 1 and 5.

Figure 4:
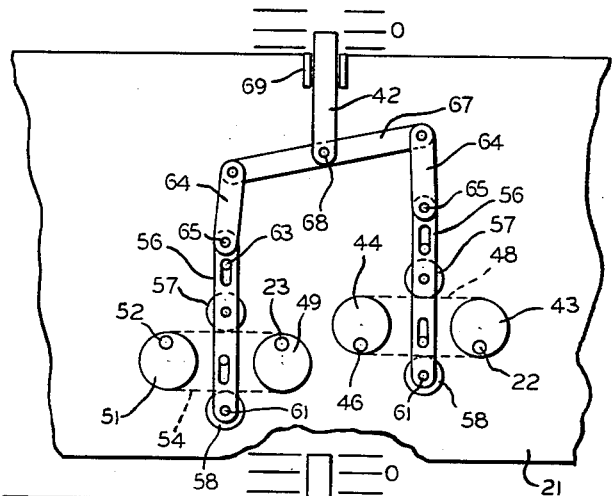
FIG. 4 is a front elevational schematic view showing the mechanism of FIG. 1 arranged to give zero amplitude of movement to the powered device controlled thereby.

By means of the control device 35 it is possible to locate the bight 33 at positions corresponding to that seen in FIGS. 2 and 3, the position of the bight seen in FIG. 2 being the one for giving the maximum reciprocating motion to the device 42. Movement of the control device 35 to the position seen in FIG. 3, will shift the paired eccentrics 43 and 44 and the paired eccentrics 49 and 51 with respect to each other to give an angular displacement of shaft 23 with respect to shaft 22. Thus, the shifting of the actuator from the position seen in FIG. 2 to the position seen in FIG. 3 causes 180° of displacement of shaft 23 with respect to shaft 22 and a consequent shift in the position of the eccentric with respect to each other of an amount equal to 180°. The eccentric will then occupy the position with respect to each other as seen in FIG. 4, and the orbital movement of the respective belts 48 and 54 and the idlers 57 and 58 contacted thereby is such that the lever 67 will be caused to rock at its pivotal point 68 on the device 42, there being no movement for the device 42 during this relative position of the paired eccentrics 43 and 44 and the paired eccentrics 49 and 51.

It is believed apparent that when the shifter 35 is moved to positions intermediate of the positions seen in FIGS. 2 and 3, that there will be corresponding angular displacement of shaft 23 with respect to shaft 22, the eccentrics carried thereby being correspondingly shifted in position to vary the stroke of the device 42, the movement of the lever 67 being such as to give the combination of pivoting at the point 68 and translative movement to the device 42 as determined by the relative angular displacement of the eccentrics.

The aforesaid variation in amplitude of the device 42 can be employed, if desired, for actuating any suitable mechanism, the output of which is in proportion to a variable stroke, such as a variable volume pump. If desired, the varying amplitude rectilinear motion can be converted into a desired rotary motion.

Referring now to FIGS. 9 and 10 of the drawings, there is shown another embodiment of the control mechanism according to the present invention referred to generally by the reference numeral 130. Control mechanism 130 includes a driving motor 131 having a driving pulley 132 drivably connected to a driven pulley 133 mounted on a shaft 134, there being an endless driving strand 136 trained between the driving pulley 132 and the driven pulley 133. A pair of driven pulleys 137 and 138 are mounted fast on the driven shaft 134. These are connected respectively by endless strands 139 and 141 to respective driven pulleys 142 and 143.

As seen in FIG. 10, the two driven pulleys 142 and 143 are in the form of chain sprockets and the endless strands 139 and 141 are in the form of sprocket chains which are also trained about the pulleys 137 and 138 which also are chain sprockets.

As seen in FIG. 10, chain sprocket 142 has a hub 144 fast to a crank shaft 146 having a throw 147 thereon. Shaft 146 is supported in a pillow block 148 lagged by screws 149 to a support plate 151.

Chain sprocket 143 likewise has a hub 152 fast to a crank shaft 153 having a throw 154 thereon. Shaft 153 is supported in a pillow block 156 lagged by screws 157 to the support plate 151. The two crank shafts 146 and 153 are driven at the same speed by driving sprockets 137 and 138.

Structure is provided for varying the angular relationship of the shafts 146 and 153. The sprocket chain 141 is accordingly arranged with a bight 158 therein which is adjusted in position by means of a control device 159. Control device 159 includes frame 161 having spaced idler sprockets 162 and 163 respectively mounted upon stub shafts 164 and 166, the two idler sprockets 162 and 163 being adapted to engage the upper reach of the endless strand 141 as seen in FIG. 9.

Frame 161 also supports idler sprockets 167 and 168 respectively mounted upon stub shafts 169 and 171, the idler sprockets 167 and 168 being adapted to engage the lower reach of the endless strand 141, seen in FIG. 9.

The control device 159 can be shifted from the solid line position seen in FIG. 9 through an infinite number of intermediate positions to the dotted line position where the bight 158 is wholly in the upper reach of the endless strand 141. In the intermediate positions of the control device each reach will have a bight therein. By so doing, the angular displacement of the shafts 146 and 153 relative to each other may be varied while the two shafts are turning at the same speed.

By suitably varying the size of the sprockets 137, 138, 142 and 143, and the distance therebetween, the angular displacement of the shafts 146 and 153 relative to each other can be varied between 0° and 180°.

Structure is provided which cooperates with the throws 147 and 154 to give a desired varying amplitude of movement to a reciprocating powered device referred to by the reference numeral 172. A guide 173 for the powered device is held by screws 174 to a support plate 176. The reciprocating device 172 is pivotally connected at 177 to the midpoint of a lever 178.

Lever 178 is connected at one end to the throw 147 by means of a pair of links 179 connected at one end to throw 147 and remote from the throw 147 by a pin 181, the pin 181 passing through a slide bar 182. A guide 183 for slide bar 182 is secured by cap screws 184 to the support plate 176. The end of the slide bar 182 remote from its connection to pin 181 is pivotally connected at 186 to a link 187 pivoted in turn at 188 to one end of the lever 178.

The other end of the lever 178 is connected to the throw 154 by means of a pair of links 189 having their ends remote from the connection to the throw 154 connected by a pin 191 passing through a slide bar 192. A guide 193 for the slide bar 192 is secured to the support plate 176 by cap screws 194. The end of the slide bar 192 remote from its connection to the pin 191 is pivotally connected at 196 to a link 197 which is pivotally connected at 198 to the other end of the lever 178.

By means of the control device 159 it is possible to locate the bight 158 in the endless strand 141 in positions giving maximum amplitude of reciprocating motion to the device 172 or to give minimum amplitude of motion thereto. As seen in FIG. 9, when the control mechanism 159 is in a position to place the maximum bight 158 in the lower run of the endless strand 141, the angular displacement of the throws 147 and 154 with respect to each other is 0°. In this position the two slide bars 182 and 192 will give maximum amplitude of movement to the actuator 172.

However, when the control mechanism 159 is moved to other positions the limit of which is marked by the dotted line position thereof seen in FIG. 9, there will be an angular displacement of the crank throw 154 with respect to the crank throw 147, the movement of the lever 178 being such as to give a combination of pivoting at the point 177 and translative movement to the device 172 as determined by the relative angular displacement of the cranks 147 and 154. It will be seen that when the cranks 147 and 154 are displaced angularly with respect to each other by 180°, the lever 178 will merely pivot about the point 177 and that there will be no reciprocating movement to the powered device 172.

From the description foregoing, it is believed evident that there has been provided some new and useful improvements in devices for achieving both rectilinear and angular motion in accordance with the setting of a control device.

While the invention has been described in terms of a number of preferred embodiments thereof, its scope is intended to be limited only by the claims here appended.

I claim as my invention:

1. In a control mechanism for varying the amplitude of rectilinear motion of a powered device in accordance with the position of a control member, a driving sprocket and a driven sprocket, a sprocket chain trained between said sprockets, means for shifting the angular relationship of said driven sprocket with respect to said driving sprocket comprising a frame having idler means engageable with said chain at points intermediate said sprockets, said control member being movable with said frame and providing with said idler means a bight in one of the reaches of said chain intermediate said sprockets, said frame being movable to provide a bight in the other of said reaches, and advance or retard the angular relationship of said sprockets, an eccentric carried by each sprocket, said eccentrics being movable relative to each other by the change in position of said bight to positions where said eccentrics are displaced from 0° to 180° with respect to each other, a rectilinearly movable follower connected to each eccentric, means connecting said followers, said powered device being connected to said last named means intermediate its ends.

2. In a control mechanism for varying the amplitude of rectilinear movement of a powered device in accordance with the position of a control member, a driving shaft and a driven shaft, means drivably connecting said shafts comprising an endless strand trained therebetween, means for shifting the angular relationship of said driven shaft with respect to said driving shaft comprising a frame having idler means engageable with said endless strand at points intermediate said shafts, said control member being movable with said frame to provide a bight in the reaches of said endless strand intermediate said shafts, said frame being movable to provide changing length bights in both of said reaches until there is a bight in the other of said reaches, and advance or retard the angular relationship of said shafts, an eccentric carried by each shaft and movable relative to each other by the change in position of said bight to positions where said eccentrics are displaced from 0° to 180° with respect to each other, a rectilinearly movable follower connected to said eccentric, means connecting said followers, said powered device being connected to said last named means intermediate its ends.

3. In a control mechanism for varying the amplitude of rectilinear movement of a powered device in accordance with the position of a control member, a driving sprocket and a driven sprocket, a sprocket chain trained between said sprockets, means for shifting the angular relationship of said driven sprocket with respect to said driving sprocket comprising a frame having means engageable with said chain at points intermediate said sprockets, said control member being movable with said frame to provide a bight in the reaches of said chain intermediate said sprockets, said frame being movable to provide changing length bights in both of said reaches until there is a bight in both of said reaches and advance or retard the angular relationship of said shafts, an eccentric carried by each sprocket, a rectilinearly movable follower connected to said eccentric, means connecting said followers, said powered device being connected to said last named means intermediate its ends.

4. In a control mechanism for varying the amplitude of rectilinear motion of a powered device in accordance with the position of a control member, a driving shaft and a driven shaft, means drivably connecting said shafts comprising an endless strand trained therebetween, means for shifting the angular relationship of said driven shaft with respect to said driving shaft comprising a frame having idler means engageable with said endless strand at points intermediate said shafts, said control member being movable with said frame and to provide a bight in the reaches of said endless strand intermediate said shafts, said frame being movable to shift said bight from one of said reaches to the other, and advance or retard the angular relationship of said shafts, an eccentric carried by each shaft, a rectilinearly movable follower connected to said eccentric, means connecting said followers, said powered device being connected to said last named means intermediate its ends.

5. In a control mechanism for varying the amplitude of rectilinear motion of a powered device in accordance with the position of a control member, a driving shaft and a driven shaft, means drivably connecting said shafts comprising an endless strand trained therebetween, said control member having means engageable with said endless strand for shifting the angular relationship of said driven shaft with respect to said driving shaft and said control member, said last named means providing a bight in the reaches of said endless strand intermediate said shafts, said control member being movable to provide changing length bights in both of said reaches until there is a bight in the other of said reaches, and advance or retard the angular relationship of said shafts, an eccentric carried by each shaft, a rectilinearly movable follower connected to said eccentric, means connecting said followers, said powered device being connected to said last named means intermediate its ends.

6. In a control mechanism for varying the amplitude of motion of a powered device in accordance with the position of a control member, a pair of shafts, means for driving said shafts including an endless strand trained between one of said shafts and its driving source, said control member having means engageable with said endless strand for shifting the angular relationship between the said one shaft and the other shaft, said last named means providing at least one bight in the reaches of said endless strand, said control member being shiftable to provide a bight in each of said reaches, an eccentric carried by each of said shafts, and means connected to said eccentrics for converting the rotary motion of said eccentrics to rectilinear motion of said powered device.

7. In a control mechanism for varying the amplitude of motion of a powered device in accordance with the position of a control member, a pair of shafts, means for driving said shafts including an endless strand trained between one of said shafts and its driving source, said control member having means engageable with said endless strand for shifting the angular relationship between the said one shaft and the other shaft, said last named means providing at least one bight in the reaches of said endless strand, said control member being shiftable to provide a bight in each of said reaches, an eccentric carried by each of said shafts, a rectilinearly movable follower connected to each eccentric, means connecting said followers, said powered device being connected to said last named means intermediate its ends.

8. In a control mechanism for varying the amplitude of motion of a powered device in accordance with the position of a control member, a pair of shafts, means for driving said shafts including an endless strand trained between one of said shafts and its driving source, said control member having means engageable with said endless strand for shifting the angular relationship between the said one shaft and the other shaft, said last named means providing at least one bight in the reaches of said endless strand, said control member being shiftable to provide a bight in each of said reaches, and an eccentric carried by each of said shafts, a rectilinearly movable follower connected to each eccentric, means connecting said followers, said powered device being connected to said last named means intermediate its ends.

References Cited in the file of this patent

UNITED STATES PATENTS

| | | |
|---|---|---|
| 512,094 | Bryant | Jan. 2, 1894 |
| 999,369 | Hogland | Aug. 1, 1911 |
| 1,351,938 | Allen | Sept. 7, 1920 |
| 2,958,226 | Hornbrook | Nov. 1, 1960 |

OTHER REFERENCES

"Product Engineering," No. 11, vol. 20, pages 121–124, November 1949, McGraw-Hill Pub. Co., New York, N.Y.